Sept. 30, 1969  H. HIERETH  3,469,564
PISTON-TYPE INTERNAL COMBUSTION ENGINE WITH FUEL INJECTION
Filed Oct. 9, 1967
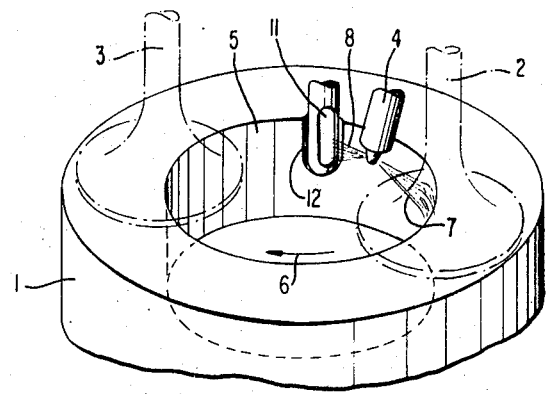
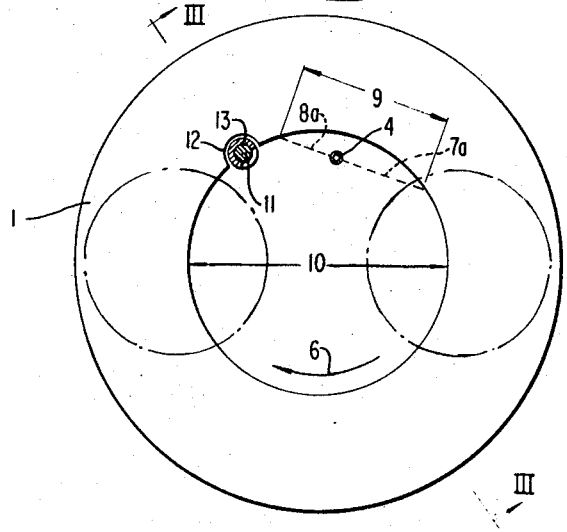
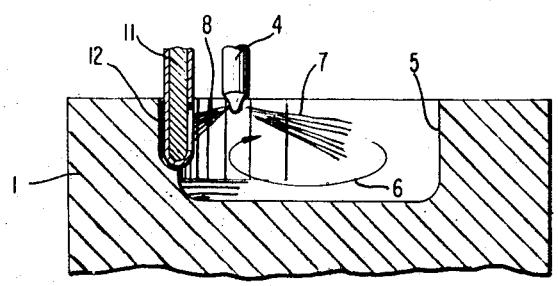
INVENTOR
HERMANN HIERETH
BY *Craig & Antonelli*
ATTORNEYS

United States Patent Office 3,469,564
Patented Sept. 30, 1969

3,469,564
PISTON-TYPE INTERNAL COMBUSTION ENGINE WITH FUEL INJECTION
Hermann Hiereth, Stuttgart-Lederberg, Germany, assignor to Daimler-Benz Aktiengesellschaft, Stuttgart-Unterturkheim, Germany
Filed Oct. 9, 1967, Ser. No. 673,767
Claims priority, application Germany, Oct. 11, 1966, D 51,272
Int. Cl. F02b 3/10
U.S. Cl. 123—30       13 Claims

ABSTRACT OF THE DISCLOSURE

A piston-type internal combustion engine with fuel injection which is provided with a cylindrical piston combustion space into which fuel is injected during the compression stroke by means of an injection nozzle having two apertures mutually displaced by about 180° to provide essentially oppositely directed jets; one fuel jet is thereby injected through one of the apertures approximately tangentially and in the same direction as the rotating in-flowing air against the combustion space wall while the other jet, serving as ignition jet, is injected into a portion of the combustion space of the internal combustion engine; the two fuel jets simultaneously form a chord of a circularly shaped transverse surface of the cylindrical piston combustion space whose length amounts to about 40 to 60% of the combustion space diameter. The chord itself is thereby subdivided into two sections of unequal length with the shorter section associated with the ignition jet and the longer section associated with the main jet.

Background of the invention

The present invention relates to a piston-type internal combustion engine with fuel injection into the compression stroke of the engine which is provided with an essentially cylindrical piston combustion space, by means of a two-aperture nozzle arranged in the cylinder head close to the combustion space edge of the piston when disposed in its upper top-dead-center position, with the two jet directions mutually displaced in the circumferential direction of the nozzle by approximately 180° whereby one fuel jet is directed approximately tangentially and in the same direction as the rotating in-flowing combustion air against the combustion space wall and the other jet, serving as ignition jet, is directed into a part of the compression space of the internal combustion engine.

With a known internal combustion engine of this type, the injection nozzle is disposed with its discharge apertures for the fuel at a circumferential place of an ignition chamber arranged in the cylinder head whereby the ignition jet is directed into the center of the ignition chamber and the main jet through a connecting channel leading from the ignition chamber into the cylinder space of the internal combustion engine approximately tengentially into an approximately ellipsoidally-shaped piston combustion space of the internal combustion engine. Even if the main jet, by reason of its injection direction extending essentially in the vortexing or rotating direction of the combustion air in-flowing into the piston combustion space, is able to arrive also in the presently customary manner at abutment against the wall as well as re-detachment, evaporation and mixing with the combustion air, it is nevertheless still disadvantageous in connection with the ignition jet that the latter is injected essentially in the in-flowing direction of the combustion air flowing into the ignition chamber during the compression stroke of the piston. This results, in such prior art arrangement, in a corresponding inadequate and in particular delayed tearing apart, atomization and fine dispersion of the ignition jet, from which one expects in particular as instantaneous as possible a preparation and—in the case of the construction of the internal combustion engine as Diesel internal combustion engine—self ignition. Unfavorable in connection with the prior art construction is also the expenditure for a separate ignition chamber arranged in the cylinder head in conjunction with the connecting channel.

Summary of the invention

The present invention aims at eliminating the aforementioned shortcomings and drawbacks and to assure with the aforementioned type of internal combustion engine a more rapid and more reliable cracking or tearing apart and preparation of the ignition jet for the formation of an ignitable as well as possible self-igniting mixture in a simple manner.

The underlying problems are solved in accordance with the present invention essentially in that the two fuel jets of the aforementioned type of internal combustion engine simultaneously form, with an otherwise conventional injection of the fuel into the piston combustion space a chord of a circularly shaped cross-sectional surface of the cylindrical piston combustion space whose length amounts to approximately 40 to 60% of the combustion space diameter.

With such an arrangement of the injection, the ignition jet is injected approximately opposite to the in-flowing combustion air flowing into the piston combustion space whereby, owing to the large relative velocity between fuel jet and combustion air, instantaneously an intensive cracking or tearing apart and atomization of the ignition jet into smallest droplets or vapor particles results which assure a rapid mixing and preparation with the combustion air. By reason of the fact that the entire injection takes place within the piston combustion space itself, all expenditures for possible ignition or vortexing chambers arranged in the cylinder head as well as connecting channels are obviated by the present invention.

According to a preferred construction of the present invention, the chord is subdivided by the injection nozzle into two sections of unequal length of which the section coordinated to the ignition jet is shorter than the other.

Whereas during the operation of an internal combustion engine of the present invention according to a customary Diesel process with the correspondingly high compression, an additional ignition source may be desirable at most for the starting of the still cold engine, the injection arrangement of the present invention is suitable in particular also for lower compressions with a value of ε of 13 to 14 at which an optimum mechanical and thermo-dynamic efficiency of the engine is obtained, as is known. However, under these operating conditions, the beginning of the ignition by self-ignition is no longer assured during cold starting, whence the present invention provides, according to a further preferred construction, that an ignition source is arranged within the area of the outer end of the section of the chord associated with the ignition jet, which ignition source according to a still further constructional feature, projects approximately axially parallel to the cylinder axis with half of its cross section into a recess or pocket starting from the edge of the piston combustion space of the piston when disposed in its upper dead-center position.

It is already known in the prior art to inject the entire fuel charge into a piston combustion space. However, one lacks with this prior art teaching to inject an ignition jet directly opposite the vortexing or rotating in-flowing combustion air, a feature also not suggested by this state of the art.

Further features relate to additional construction details of the internal combustion engine of the present invention.

Accordingly, it is an object of the present invention to provide a piston-type internal combustion engine with fuel injection which eliminates by extremely simple means the aforementioned shortcomings and drawbacks encountered in the prior art.

Another object of the present invention resides in a reciprocating-type piston internal combustion engine with fuel injection which is simple in construction and reliable in operation, yet avoids the need of large expenditures as to structural details thereof.

A further object of the present invention resides in a fuel-injection-type internal combustion engine which assures good fuel preparation and mixing with the combustion air under all operating conditions.

A still further object of the present invention resides in an internal combustion engine of the injection type which minimizes the delay of the fuel preparation and mixing during the starting of the engine and which eliminates delays in the atomization of the fuel.

Another object of the present invention resides in an internal combustion engine of the injection type which dispenses with the need of a separate ignition chamber and connecting channel in the cylinder head.

Still another object of the present invention resides in an injection-type internal combustion engine of the type described above which assures both during normal operation and starting an ignitable as well as possible self-igniting mixture in an extremely simple manner.

A further object of the present invention resides in an injection-type internal combustion engine which assures rapid mixing and preparation of the fuel with the combustion air without danger under conditions of quick-starting with a cold engine.

These and further objects, features, and advantages of the present invention will become more obvious from the following description when taken in connection with the accompanying drawing which shows, the purposes of illustration only, one embodiment in accordance with the present invention, and wherein:

FIGURE 1 is a perspective schematic side view, taken from above at an inclination, of an internal combustion engine according to the present invention with its piston approximately in the upper top dead-center position of its compression stroke, the remander of the internal combustion engine being indicated in the drawing for sake of simplicity only by the injection and ignition installation as well as the suspended valves;

FIGURE 2 is a transverse cross-sectional view through the internal combustion engine according to FIGURE 1, with the partial cross section taken in the plane of the piston disposed in the upper top dead-center position, i.e., in the same position as schematically indicated in FIGURE 1, and FIGURE 3 is a partial cross-sectional view through the piston together with the injection and ignition installation taken along line III—III of FIGURE 2.

Referring now to the drawing wherein like reference numerals are used throughout the various views to designate like parts, the illustrated piston 1 is a component part of a reciprocating-type piston internal combustion engine, not illustrated in detail, having for each cylinder a suspended inlet valve 2 and outlet valve 3 as well as fuel injection into the compression stroke by way of a two-aperture nozzle 4 arranged in the cylinder head. The compression space of the cylinder, formed within the area of the upper top dead-center position of the piston 1, is formed essentially by an approximately cylindrical piston combustion space 5 arranged axially within the piston, into which the two-aperture nozzle 4 projects slightly according to FIGURE 3 in the upper dead-center position of the piston 1. A vortexing or rotation in the direction of the arrow 6 is imparted by conventional means (not illustrated) to the in-flowing combustion air flowing into the cylinder, as a result of which the combustion air flows into the piston combustion space rotating in the clockwise direction as viewed in the drawing.

The two-apertured nozzle 4 is provided in the circumferential direction of the nozzle with jet directions mutually displaced by about 180° whereby one fuel jet 7 is injected approximately tangentially and in the same direction as the rotating in-flowing combustion air against the combustion space wall and the other fuel jet 8, serving as ignition or pilot jet, is injected directly opposite the direction of rotation of the combustion air. The fuel jets 7 and 8 form simultaneously a chord of a circularly shaped cross-sectional surface of the cylindrical piston combustion space 5 whose length 9 amounts approximately to 40 to 60% of the combustion space diameter 10. The chord 9 is thereby subdivided by the two-apertured nozzle 4 into two unequally long sections 7a and 8a determined by the fuel jets 7 and 8 of which the section 8a coordinated to the ignition jet is shorter than the other section 7a coordinated to the main fuel jet 7. The section 8a coordinated to the ignition jet 8 preferably amounts to at most 30% and in a preferred application only to about 15% of the length 9 of the chord.

During the operation of an internal combustion engine of the type described hereinabove operating according to the usual diesel process, the relative velocity between the ignition jet 8 and the rotating combustion air is so large that the ignition jet 8 is torn apart very rapidly, is atomized into smallest droplets and is evaporated and therewith an ignitable mixture results in conjunction with the combustion air. Consequently, the combustion starts with a short ignition delay after only a porion of the entire fuel has been injected. The flame front thereafter moves with the air movement toward the fuel jet 7 injected in the direction of rotation of the rotating combustion air, which fuel jet 7 possesses only a small velocity relative to the combustion air, increasing only with increasing jet length and therewith with decreasing jet velocity. The fuel jet 7 therefore develops only relatively late an ignitable mixture which is seized by the arriving flame front. A continuously increasing heat-release results, i.e., the favorable form of the heat conversion from a combustion point of view.

The automatic ignition is assured with the diesel process only with relatively high air temperatures which, for realizing these high air temperatures, requires a high compression and therewith entails a high drive-unit loading by the combustion pressure building up after the compression pressure. The aims of the internal combustion engine construction therefore seek to realize only compressions with an $\epsilon$ value of 13 to 14 which corresponds to an optimum mechanical and thermo-dynamic efficiency. However, with such a compression the beginning of the ignition by means of self-ignition is no longer assured, especially during cold-starting, whence also the injection arrangement described hereinabove is additionally provided according to the drawing with an external ignition source, according to the illustrated embodiment with a glow plug 11.

The glow plug 11 is arranged within the area of the outer end of the section 8a of the aforementioned chord associated with the ignition jet 8 and therefore may be located, as illustrated in FIGURE 2, opposite the direction of rotation either in front of the section 8a or also shortly to the rear of the section 8a.

The glow plug 11 projects, according to FIGURES 2 and 3, approximately axially parallel to the cylinder axis with half of its cross section in a recess or pocket 12 of the piston 1, when disposed in its upper dead-center position whereby the recess or pocket 12 starts from the edge of the piston combustion space 5. In the upper dead-center position of the piston 1, the glow plug 11 additionally projects, according to FIGURE 3, approximately up to half the depth of the piston combustion space 5 into the latter. The glow plug 11 is shielded with respect to the inflowing combustion air flowing thereagainst in the direction of rotation and within its area disposed radially outward to the combustion space by a shielding tube 13.

It is possible in this manner to either ignite safely fuels difficult to ignite (anti-knock fuels) or to let the diesel engine operate at optimum compression conditions— $\epsilon = 13$ to 14—and nevertheless to assure the ignition during cold-starting or partial load.

A particular advantage of the last-described arrangement resides in the fact that the ignition source is disposed within the area of the best mixture formation and additionally very close to the nozzle. As a result thereof, the paths which the fuel has to traverse, are short and differing energies of the atomized fuel (full-load-to-idling) or high jet velocities (during high rotational speeds) can no longer have an ignition delaying effect or even endanger the safe ignition.

While I have shown and described only one embodiment in accordance with the present invention, it is understood that the same is not limited thereto but is susceptible of numerous changes and modifications as known to a person skilled in the art. In lieu of a glow plug, a spark plug may also be provided as ignition source in which case, in lieu of the described shielding plate, a shielding pipe is appropriately used which is provided at its bottom and/or facing the ignition jet with an aperture. The beginning of the ignition then also takes place at the ignition jet, however, instead of by an increased air temperature by the supplied ignition energy. The remainder of the combustion process, however, corresponds to that described hereinabove.

Thus, it is obvious that the present invention is not limited to the details shown and described herein but is susceptible of numerous changes and modifications as known to a person skilled in the art, and I therefore do not wish to be limited to these details but intend to cover all such changes and modifications as are encompassed by the scope of the appended claims.

I claim:

1. A piston internal combustion engine with fuel injection into the compression stroke of the engine, which is provided with an essentially cylindrical piston combustion space into which a rotating in-flow of air is inducted, a two-apertured nozzle means arranged in the cylinder head near the combustion space edge of the piston when disposed in its upper dead-center position, the two-apertured nozzle means being operable to produce jet directions displaced in the circumferential direction of the nozzle approximately by 180° to one another, one of the fuel jets being directed approximately tangentially and in the same direction as the rotating in-flowing combustion air against the combustion space wall and the other jet, serving as ignition jet, being directed into a part of the combustion space of the internal combustion engine, wherein the improvement comprises two fuel jets from said nozzle means, injecting substantially all of the fuel for the combustion stroke into the piston combustion space, said two fuels jets forming a chord of a substantially circularly-shaped cross-sectional surface of the essentially cylindrical piston combustion space, the length of said chord amounting to about 40 to 60% of the combustion space diameter, said chord being subdivided by said nozzle means into two sections of unequal length, the section associated with the ignition jet being shorter than the section associated with the other jet.

2. The improvement according to claim 1, wherein the section of the chord associated with the ignition jet amounts to at most 30% of the length of the chord.

3. The improvement according to claim 1, wherein the section of the chord associated with the ignition jet amounts to about 15% of the length of the chord.

4. The improvement according to claim 2, wherein an ignition source is provided within the area of the outer end of the section of the chord associated with the ignition jet.

5. The improvement according to claim 4, wherein the outer end of the section of the chord facing the ignition jet is disposed shortly in front of the ignition source.

6. The engine according to claim 4, wherein the outer end of the section of the chord facing the ignition jet is disposed shortly behind the ignition source.

7. The engine according to claim 4, wherein the ignition source projects approximately axially parallel to the cylinder axis with half of its cross section into a recess of the piston in its upper dead-center position, with the recess starting from the edge of the piston combustion space.

8. The engine according to claim 7, wherein the ignition source in the upper dead-center position of the piston projects into the piston combustion space about to half the depth thereof.

9. The engine according to claim 8, wherein the ignition source constructed as glow plug, is shielded with respect to the in-flowing combustion air flowing thereagainst in the direction of rotation and with its area disposed radially outwardly to the piston combustion space by a shielding tube means.

10. The engine according to claim 8, wherein the ignition source is constructed as spark plug, and wherein the electrodes of the spark plug are shielded with respect to the in-flowing combustion air flowing thereagainst in the direction of rotation and in its area disposed radially outwardly to the piston combustion space by a shielding tube means.

11. The improvement according to claim 10 wherein the shielding tube means is provided with aperture means at the bottom.

12. The improvement according to claim 10, wherein the shielding tube means is provided with aperture means facing the ignition jet.

13. The improvement according to claim 10, wherein the shielding tube means is provided with aperture means at the bottom and within the area facing the ignition jet.

References Cited

UNITED STATES PATENTS

| | | | |
|---|---|---|---|
| 2,803,229 | 8/1957 | Schwaiger | 123—32 |
| 2,837,067 | 6/1958 | Meurer | 123—32 |
| 3,244,159 | 4/1966 | Meurer | 123—32 |
| 3,302,627 | 2/1967 | Morris | 123—32 |

LAURENCE M. GOODRIDGE, Primary Examiner

U.S. Cl. X.R.

123—32